United States Patent
Suzuki et al.

[11] Patent Number: 6,116,267
[45] Date of Patent: Sep. 12, 2000

[54] VALVING DEVICE

[75] Inventors: Hidenao Suzuki, Fujisawa; Kuniaki Horie, Yamato; Kiwamu Tsukamoto, Chigasaki; Yuji Araki, Fujisawa, all of Japan

[73] Assignee: Ebara Corporation, Tokyo, Japan

[21] Appl. No.: 09/172,146

[22] Filed: Oct. 14, 1998

[30] Foreign Application Priority Data

Oct. 20, 1997 [JP] Japan ................... 9-304902

[51] Int. Cl.⁷ ........................... F16K 49/00
[52] U.S. Cl. ....................... 137/340; 251/335.1
[58] Field of Search ................. 137/340, 334; 251/335.1

[56] References Cited

U.S. PATENT DOCUMENTS

| | | |
|---|---|---|
| 2,823,696 | 2/1958 | Detlefson . |
| 3,491,789 | 1/1970 | Callahan, Jr. et al. ........ 137/340 |
| 3,647,344 | 3/1972 | Skibo et al. ........... 425/379.1 |
| 3,831,622 | 8/1974 | Grewer et al. ........... 137/340 |
| 4,715,400 | 12/1987 | Gardner et al. ........... 137/341 |

FOREIGN PATENT DOCUMENTS

| | | |
|---|---|---|
| 0 351 164 | 1/1990 | European Pat. Off. . |
| 0 757 196 | 2/1997 | European Pat. Off. . |
| 0 795 707 | 9/1997 | European Pat. Off. . |
| 2 304 845 | 10/1976 | France . |

Primary Examiner—John Fox
Attorney, Agent, or Firm—Wenderoth, Lind & Ponack, L.L.P.

[57] ABSTRACT

A valving device can operate stably to provide switching or flow rate control operations, even when it is used for controlling thermodynamically unstable gases. The valving device including a valve casing having an internal passage for process fluids. A valve body is movable against a valve seat for adjusting opening of the internal passage, and a valve driving mechanism can drive the valve body. A flexible member is provided for separating a fluid handling space including the internal passage from a valve mechanism space for housing the valve driving mechanism. A thermal medium space is formed within the valve mechanism space for receiving a thermal medium for providing heat to the valve body.

6 Claims, 3 Drawing Sheets

VALVING DEVICE

BACKGROUND OF THE INVENTION

1. Field of the Invention

The present invention relates to a valving device for controlling gaseous feed of organo-metallic compounds used typically in a metallorganic chemical vapor deposition (MOCVD) apparatus for making thin films of ferroelectric or highly dielectric materials.

2. Description of the Related Art

In recent years, there has been a quantum jump in circuit density of integrated circuit devices produced by the semiconductor industry, and intense development activities are underway in anticipation of giga-bit order DRAMs replacing the prevailing mega-bit order DRAMs of today. Dielectric thin film materials Ad used to make high capacitance devices necessary for producing DRAMs have, in the past, included silicon oxide or silicon nitride films of dielectric constant less than ten, tantalum pentaoxide ($Ta_2O_5$) films of dielectric constant of about twenty; metal oxide films of dielectric constant of about three hundred, such as barium titanate ($BaTiO_3$) or strontium titanate ($SrTiO_3$) films, or barium/strontium titanate films of a mixed composition, appear to be promising. Promising also are even higher dielectric materials such as lead-zinc-titanate (PZT), lead-lithium-zinc-titanate (PLZT) and Y1.

Of the various methods for making such thin films, prospects are particularly bright for the metallorganic chemical vapor deposition (MOCVD) process, and in this case, it is necessary that a gaseous feed must be supplied in a steady gas stream to asubstratedisposed inafilmdepositionchamber. The gaseous feed is produced by heating and vaporizing a liquid mixture, produced by dissolving such materials as $Ba(DPM)_2$ or $Sr(DPM)_2$, which is solid at normal temperature into some organic solvent such as tetrahydrofuran or THF.

However, such gaseous materials present a serious problem that they can exist in thermodynamic stability only in a narrow range of pressures and temperatures. This means that if temperature drops or pressure rises in the system, solid components in the gaseous feed can deposit, and if the ambient temperature rises, reaction can take place to produce residual solid particles. Because of the narrow opening between a valve body and a valve seat, when the gaseous material is passing through a valve, adiabatic expansion causes a local drop in the valve temperature. Changes in temperature or pressure of the process gas cause deposition of residual particles on such valving devices as gas flow control valves or feed switching valves, ultimately resulting in degradation in the performance of the affected valving devices.

SUMMARY OF THE INVENTION

It is an object of the present invention to provide a valving device that can operate stably to provide switching or flow rate control operations, even when it is used for controlling thermodynamically unstable gases, such as gaseous process material for making thin films of ferromagnetic or highly dielectric substances.

The object has been achieved in a valving device comprising: a valve casing having an internal passage for process fluids; a valve body movable against a valve seat for adjusting opening of the internal passage; a valve driving mechanism for driving the valve body; a flexible member for separating a fluid handling space including the internal passage from a valve mechanism space for housing the valve driving mechanism; and a thermal medium space formed within the valve mechanism space for receiving a thermal medium for providing heat to the valve body.

In the present valving device, because the valve body is directly heated by a thermal medium, having a high heat capacity, flowing in the thermal medium space, mechanical interference effects, produced by condensed or precipitated particles created by sudden cooling of the valve body due to adiabatic expansion of the process fluid, are prevented. A high heat capacity thermal medium such as synthetic oils is suitable. Because of the high heat content of the thermal medium, the rise time is shortened for the deposition apparatus using such a valving device.

The flexible member may be supported by a supporting member which is connected to the valve driving mechanism. In this case, the flexible member may function as a valve body. The flexible member may be formed separate from or attached to the valve body.

The flexible member may be formed as a membrane or a bellows, depending on the particular application.

The valve driving mechanism may include a biasing member for pressing the valve body at a constant pressure or an actuating device for actively adjusting displacement of the valve body.

As explained above, the valving device of the present invention incorporates heating means in the valving mechanism, so as to prevent the formation of condensed or precipitated particles, thereby enabling it to be used for gaseous substances, such as organo-metallic gases used in MOCVD, which are thermodynamically unstable. By preventing mechanical interference effects produced by such particles depositing on the valving mechanisms, CVD apparatus can be made more reliable and contribute to producing advanced devices of high quality.

DETAILED DESCRIPTION OF THE PREFERRED EMBODIMENTS

Figure 1:
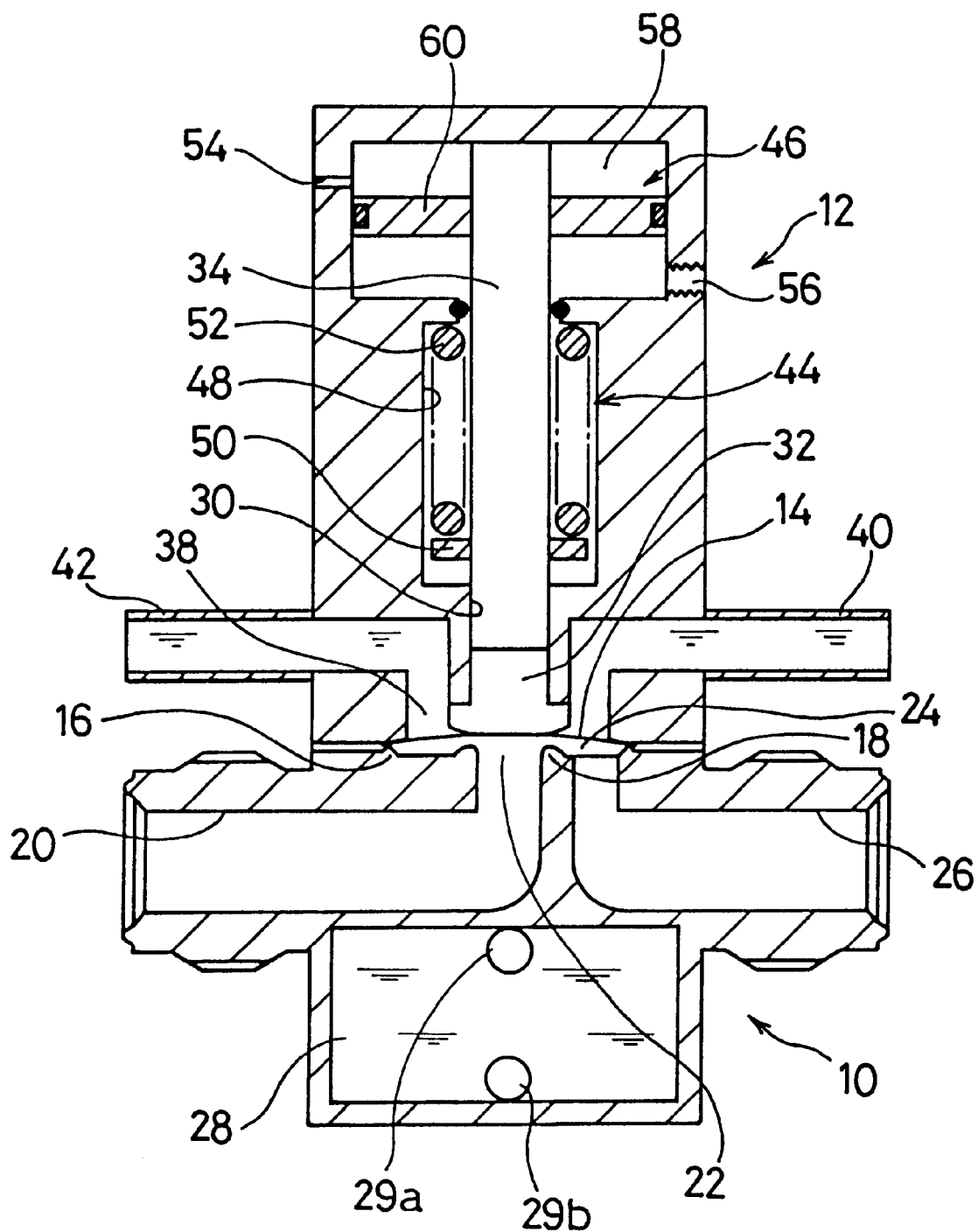
FIG. 1 is an overall cross sectional view of a membrane type valving device of the present invention in an open-position.
Figure 2:
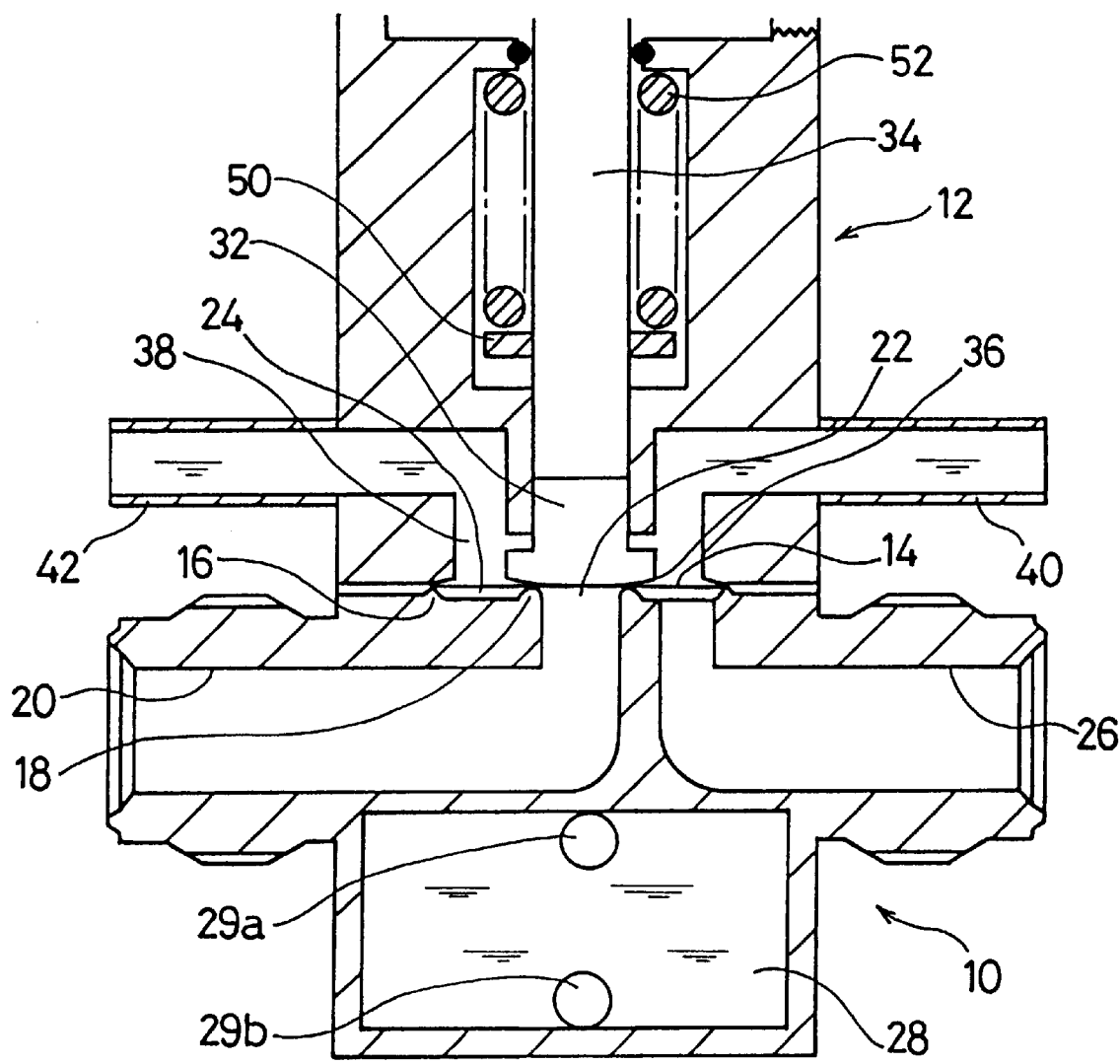
FIG. 2 is an enlarged cross sectional view of the membrane type valving device in a closed-position.

FIGS. 1 and 2 show a first embodiment of the membrane type valving device of the present invention, and FIG. 1 shows an open-position and FIG. 2 shows a closed-position of the valving device which provides a sealing action by a solid valve contacting a membrane. The valving device comprises: a lower valve casing 10; an upper valve casing 12; a diaphragm (valve body) 14 disposed between the lower and upper casings 10, 12. A first annular protrusion 16 (a diaphragm fixing section) extending in the circumferential direction and a concentric second protrusion 18 (valve seat), formed on the inside of the first protrusion 16, are provided on the upper surface of the lower casing 10. It is preferable that the diaphragm 14 be made of a material, such as a cobalt alloy, capable of resisting repeated flexing without breaking, even when made into a sufficiently thin sheet for flexibility as well as having an adequate sealing ability.

A process gas inlet passage 20 is formed on the left side of the lower casing 10 and extends towards the center and rises therefrom to an opening provided in a primary space 22 formed between the diaphragm 14 and the valve seat 18. A process fluid gas outlet passage 26 located opposite to the gas inlet passage 20 has an opening provided in an annular secondary space 24 formed between the valve seat 18 and the diaphragm fixing section 16, and extends towards the right of the lower casing 10. Below the lower casing 10, there is a first thermal medium space 28 to provide heat to the lower casing 10 so as to maintain the temperature of the gas inlet passage 20 and the valve seat 18 at some an elevated temperature, as necessary. The first thermal medium space 28 is provided with a pair of inlet and outlet ports 29*a*, 29*b* for flowing a thermal medium to and from the first thermal medium space 28.

As shown in FIG. 2, a valve driving mechanism for operating the valve body 14 is assembled into the upper casing 12. Specifically, a valve opening 30 is formed in the center of the upper casing 12, and a shaft member 34 having a valve supporting member 32 attached to its tip section is inserted inside so as to be vertically movable. The tip end of valve supporting member 32 has substantially the same diameter as the annular valve seat 18, and is formed to have a flat or large curvature curved surface, and its periphery is smoothly slanted to form a tapered surface 36. A second thermal medium space 38 is formed so as to surround the valve supporting member 32, and is communicated with a medium inlet passage 40 and a medium outlet passage 42 for flowing a thermal medium supplied from an external thermal medium circulating piping.

The valving device is a constant pressure type in which the valve supporting member 32 is biased by a pressing device with a predetermined biasing force towards a closed-position so that process gas in the primary side flows to the secondary side when the pressure in the primary side exceeds a predetermined operating pressure corresponding the biasing force. Two types of pressing devices are used in this embodiment, a spiral spring device 44 and an air cylinder 46. In more detail, a spring housing space 48 is formed in the a mid-height section of the upper casing 12 to surround the valve shaft 34. A spiral spring 52 is housed inside the space 48, and forces the valve shaft 34 downward via a spring stop 50. An air cylinder space 58 having air inlet/outlet ports 54, 56 is formed in the a top section of the upper casing 12 which houses a piston plate 60 attached to the valve shaft 34 slidably along the valve shaft direction with appropriate seal members where necessary.

The overall apparatus is also provided with a control section for setting the operating pressure for the pressing mechanism device to operate the valving device as well as a thermal medium controller for controlling the temperatures of the thermal medium flowing in the thermal medium spaces 28, 38, are also but details thereof are omitted.

The operation of the valving device will be explained in the following. Temperatures and pressures for various locations of the system are set to certain values, and the process gas outlet 26 is communicated with a downstream deposition apparatus. Process gas is introduced into the primary space 22 from a gas supply section (not shown) such as a liquid feed vaporizer through gas inlet passage 20. When the pressure from the process fluid supply section exceeds the biasing force applied to the valve supporting member 32 by the pressing devices 44, 46, a minute opening is formed between the valve seat 18 and the valve body 14 pressed by the valve supporting member 32, and the process fluid flows to the secondary space 24 through this minute opening toward the deposition apparatus.

In the secondary side in the boundary section between a primary and secondary spaces 22, 24, the process gas pressure is suddenly released in the low pressure region. In this process, the process gas undergoes an adiabatic expansion, and the ambient temperature drops. However, because a thermal medium is flowing behind the thin-walled diaphragm 14, heat is supplied instantly to the surrounding areas and the temperatures of either the process gas or the valve body are prevented from cooling. It follows that condensation or precipitation of solid matter does not take place in this region, thus preventing particle interference effects from affecting the valving action.

In the valving device of such a construction, the feed gas passage within the device is heated by a thermal medium, having a high heat capacity, so that uniformity of temperatures in various sections can be maintained. Another benefit is that the rise time of the deposition apparatus is shortened by quick circulation of the thermal medium maintained at an operating temperature into the thermal medium spaces 28, 38.

Figure 3:
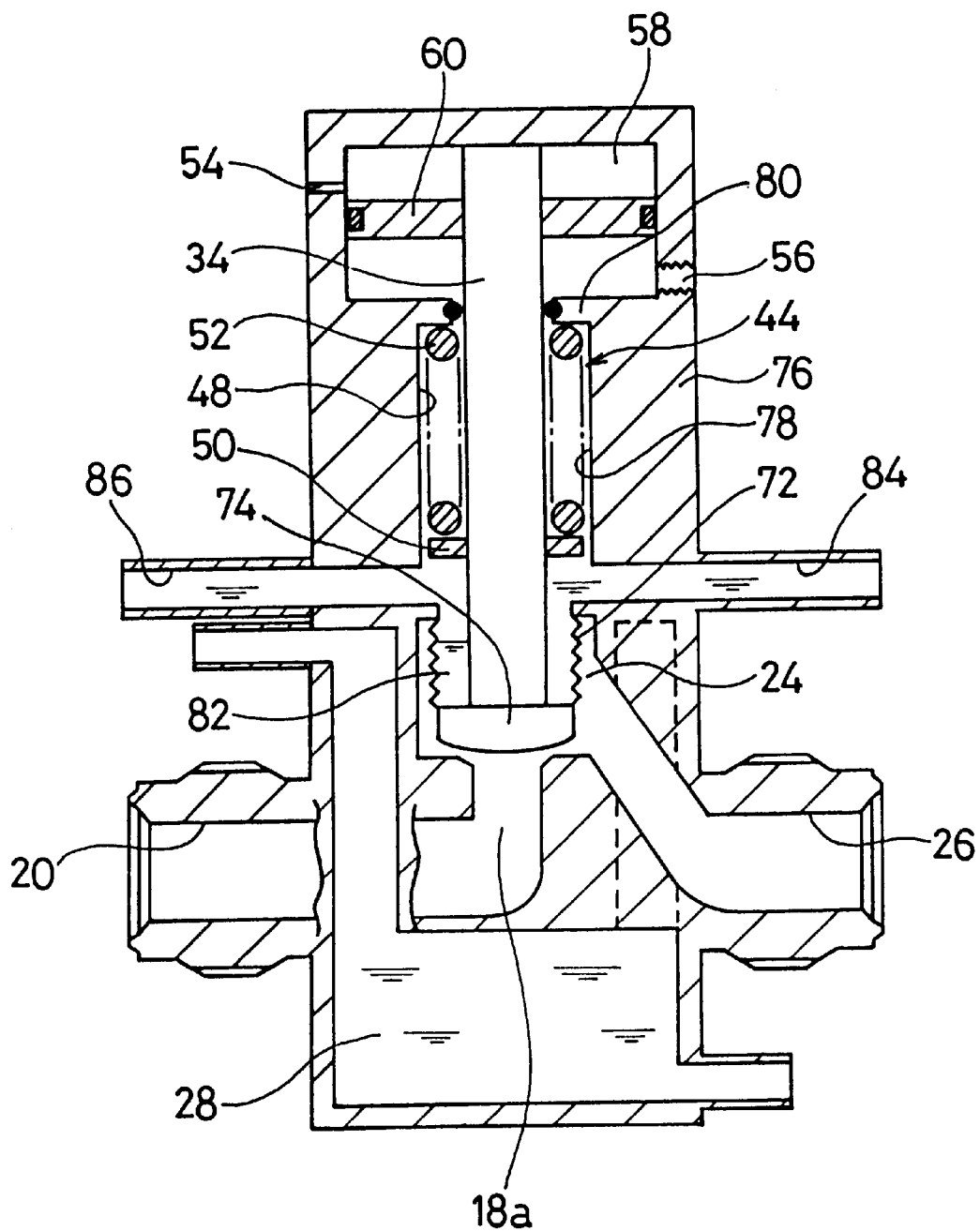
FIG. 3 is a cross sectional view of a bellows type valving device in an open-position.

FIG. 3 shows a second embodiment of the valving device which provides a sealing action by a solid valve body 74 contacting a solid valve seat 18*a*. In the valving device of the first embodiment, a fluid handling space for flowing process gas is separated from a valve mechanism space for housing a valve driving mechanism by the diaphragm 14 itself, but in the second embodiment, they are separated by a bellows 72. In more detail, valve body 74 having the same shape as the first embodiment is attached at the tip end of the valve shaft 34 for sealing, and the bottom edge of the bellows 72 is attached to an upper edge of the valve body 74, while the upper edge of an bellows 72 is attached to an inner edge of an annular plate 80 protruding from an inner surface of a valve opening 78 formed in a casing 76.

Interior space of the bellows 72 constitutes a part of the second thermal medium space 82, and the thermal medium introduced through thermal medium passages 84, 86 provides heat to the valve shaft 34 as well to the valve body 74. In the second embodiment, the secondary space 24 is formed as a cylindrically shaped space surrounding the valve body 74 and the bellows 72 so that the bellows surface itself can act as a heating surface for the process gas.

In the embodiments presented above, the valving device is constructed as a valve inactively operated by the process fluid, such as a constant pressure valve or a check valve, but it is also permissible to use close/open valves or flow control valve actively operated by an exterior driving device such as an air cylinder. It is obvious that drive and control devices may be altered to suit individual applications without departing from the spirit of the invention.

What is claimed is:

1. A valving device comprising:

a valve casing having an internal passage for a process fluid, and a valve seat;

a valve body movable against said valve seat for adjusting opening of said internal passage;

a valve driving mechanism for moving said valve body;

said valve body comprising a diaphragm separating a fluid handling space including said internal passage from a valve mechanism space housing said valve driving mechanism;

a first thermal medium space within said valve casing to receive a thermal medium to provide heat to said valve casing; and a second thermal medium space within said valve mechanism space to receive a thermal medium to provide heat to said valve body.

2. A valving device as claimed in claim 1, wherein said valve driving mechanism comprises a biasing member for pressing said valve body at a constant pressure.

3. A valving device as claimed in claim 1, wherein said valve driving device comprises an actuating device for actively adjusting displacement of said valve body.

4. A valving device comprising:

a valve casing having an internal passage for a process fluid, and a valve seat;

a valve body movable against said valve seat for adjusting opening of said internal passage;

a valve driving mechanism for moving said valve body;

a bellows connected to said valve body and separating a fluid handling space including said internal passage from a valve mechanism space housing said valve driving mechanism;

a first thermal medium space within said valve casing to receive a thermal medium to provide heat to said valve casing; and a second thermal medium space within said valve mechanism space and including an interior of said bellows to receive a thermal medium to provide heat to said valve body.

5. A valving device as claimed in claim 4, wherein said valve driving mechanism comprises a biasing member for pressing said valve body at a constant pressure.

6. A valving device as claimed in claim 4, wherein said valve driving device comprises an actuating device for actively adjusting displacement of said valve body.

* * * * *